United States Patent
Gehrke et al.

(10) Patent No.: US 6,950,592 B1
(45) Date of Patent: Sep. 27, 2005

(54) FIBER OPTIC CABLE MANAGEMENT SYSTEM

(75) Inventors: Gary C. Gehrke, San Jose, CA (US); Boyd R. Baty, Wheatridge, CO (US)

(73) Assignee: Ciena Corporation, Linthicum, MD (US)

( * ) Notice: Subject to any disclaimer, the term of this patent is extended or adjusted under 35 U.S.C. 154(b) by 181 days.

(21) Appl. No.: 10/158,813

(22) Filed: May 31, 2002

(51) Int. Cl.[7] ................................................ G02B 6/36
(52) U.S. Cl. ...................................... 385/134; 385/135
(58) Field of Search ................................ 385/134–139, 385/37

(56) References Cited

U.S. PATENT DOCUMENTS

| | | | | |
|---|---|---|---|---|
| 4,776,662 A | * | 10/1988 | Valleix ........................ | 385/137 |
| 5,142,606 A | * | 8/1992 | Carney et al. ............... | 385/134 |
| 5,640,482 A | * | 6/1997 | Barry et al. ................. | 385/135 |
| 5,717,810 A | * | 2/1998 | Wheeler ...................... | 385/135 |
| 5,737,475 A | * | 4/1998 | Regester ...................... | 385/134 |
| 5,758,003 A | * | 5/1998 | Wheeler et al. ............. | 385/134 |
| 5,835,657 A | * | 11/1998 | Suarez et al. ................ | 385/135 |
| 5,913,006 A | * | 6/1999 | Summach .................... | 385/134 |
| 6,160,946 A | * | 12/2000 | Thompson et al. .......... | 385/134 |
| 6,201,919 B1 | * | 3/2001 | Puetz et al. .................. | 385/134 |
| 6,535,682 B1 | * | 3/2003 | Puetz et al. .................. | 385/135 |
| 6,541,704 B1 | * | 4/2003 | Levenson et al. ........... | 174/72 A |
| 6,571,047 B1 | * | 5/2003 | Yarkosky et al. ............ | 385/135 |
| 6,584,267 B1 | * | 6/2003 | Caveney et al. ............. | 385/134 |
| 6,621,975 B2 | * | 9/2003 | Laporte et al. .............. | 385/135 |
| 6,633,717 B1 | * | 10/2003 | Knight et al. ................ | 385/135 |

* cited by examiner

*Primary Examiner*—Joseph Williams
*Assistant Examiner*—Dalei Dong
(74) *Attorney, Agent, or Firm*—Michael R. Cammarata

(57) ABSTRACT

One or more fiber optic cable management systems provided with an optical communications housing for managing and routing fiber optic cables. Each fiber optic cable management system includes a series of saddle brackets, and a channel for routing and separating matrix fiber optic cables from customer fiber optic cables. Each saddle bracket is capable of routing customer fiber optic cables in multiple directions without bending the customer cables beyond their minimum bend radii. As many saddle brackets as practical are provided in the fiber optic cable management system. Providing a multitude of saddle brackets allows the slack in the customer fiber optic cables to be distributed across more brackets, and allows each saddle bracket to be shorter. Shorter saddle brackets, in turn, increases hand space for a technician to manipulate and route the customer fiber optic cables.

33 Claims, 2 Drawing Sheets

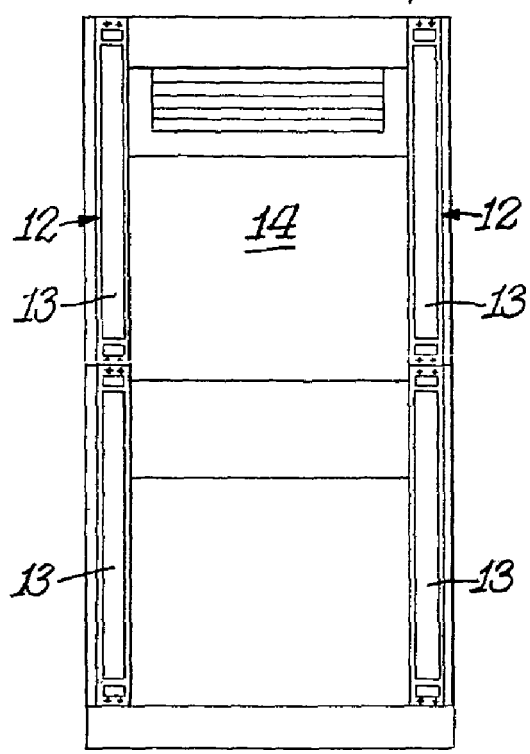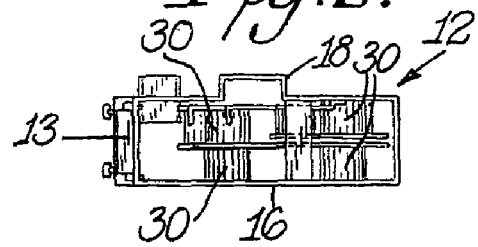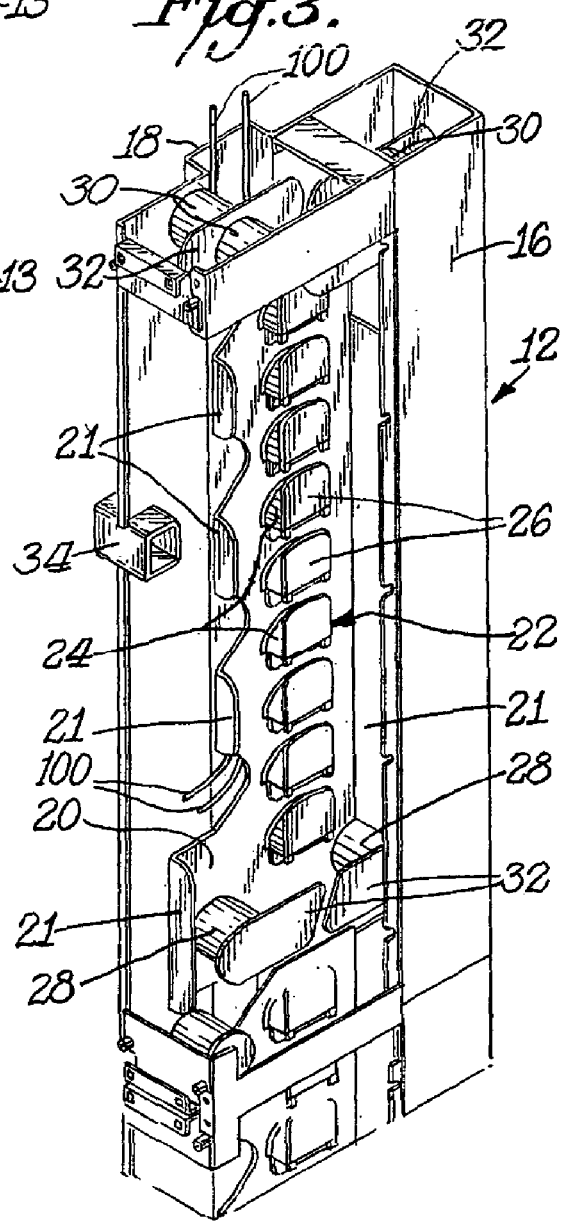

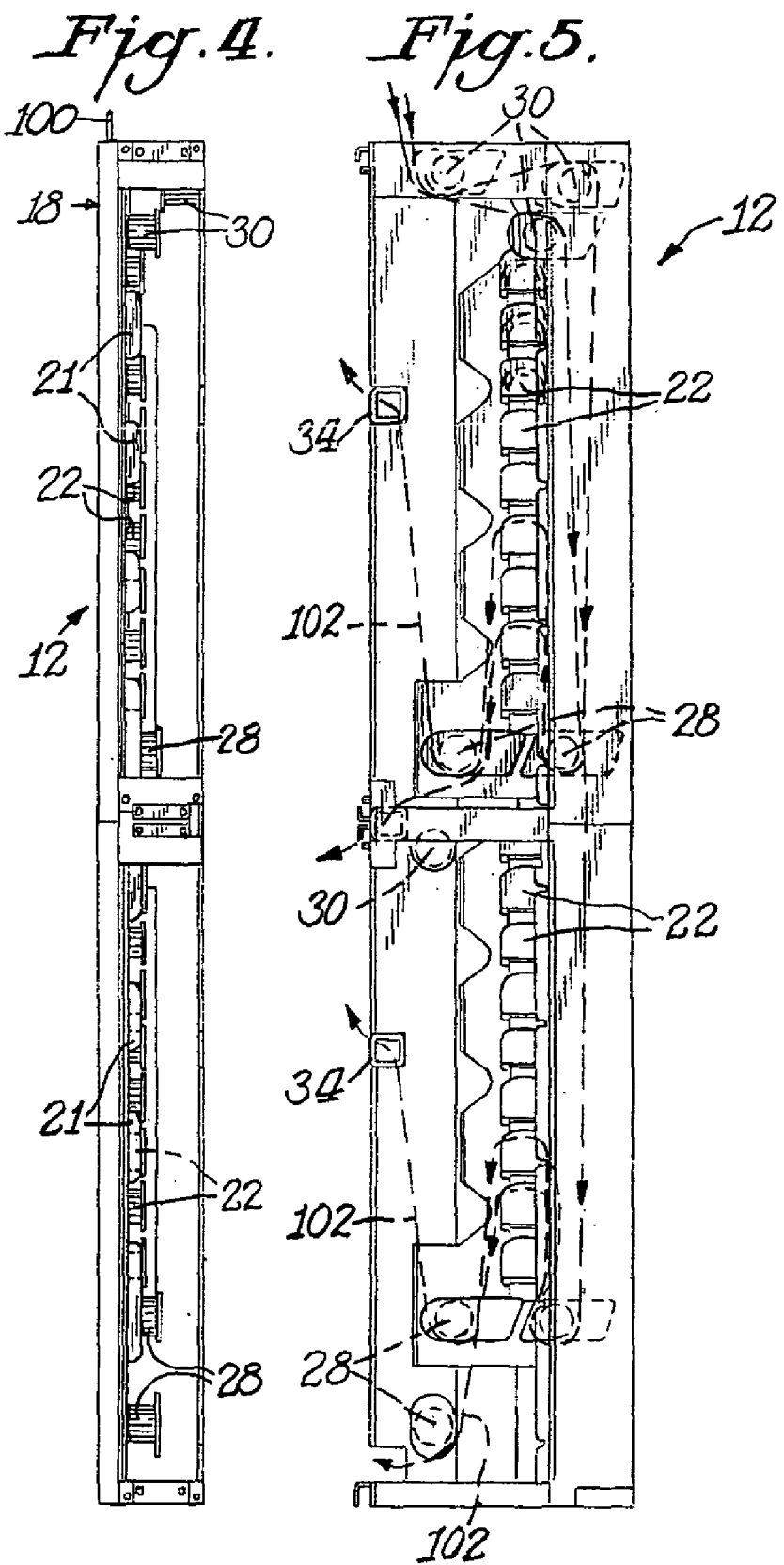

FIBER OPTIC CABLE MANAGEMENT SYSTEM

BACKGROUND OF THE INVENTION

A. Field of the Invention

The present invention relates generally to the communications field, and, more particularly to a fiber optic cable management system.

B. Description of the Related Art

Presently, it is a problem in the field of communication cable installation to ensure the precise placement of the communication cable without the possibility of damage to the communication cable by the provision of tight bends, or inappropriate use of fasteners, or inadequate support to the communication cable. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installer of communication cable is thus faced with the problem of routing the communication cable over surfaces, which typically include sharp bends, without over bending the communication cable, yet also securing the communication cable to these surfaces in a manner to ensure protection from damage.

This problem is further heightened when fiber optic cables (alternatively referred to as "optical fibers" or "fibers") are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which the fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fiber(s) contained in the cable, and the shorter the life span of the cable.

Optical communication equipment is typically housed in bays of an optical communications housing, which include a rectangular frame having dimensions conforming to a particular standard, such as the Network Equipment Building Standard (NEBS). NEBS was originally developed by Bell Telephone Laboratories in the 1970s and expanded by Bellcore. Long a requirement for equipment used in the Central Office in the North American Public Switched Network, the NEBS criteria have become a universal measure of network product excellence.

NEBS covers a large range of requirements including criteria for personnel safety, protection of property, and operational continuity. NEBS covers both physical requirements including: space planning, temperature, humidity, fire, earthquake, vibration, transportation, acoustical, air quality and illumination; and electrical criteria including: electrostatic discharge (ESD), electromagnetic interference (EMI), lightning and AC power fault, steady state power induction, corrosion, DC potential difference, electrical safety and bonding and grounding. The term "electrostatic discharge" or "ESD", as used herein, refers to the rapid, spontaneous transfer of electrostatic charge induced by a high electrostatic field. Usually the charge flows through a spark (static discharge) between two bodies at different electrostatic potentials as they approach one another.

An optical communications housing further typically has a plurality of shelves, each having one or more slots for accommodating circuit boards or cards that have optical and electrical components associated with a communication network mounted thereon. The components include, but are not necessarily limited to lasers, photodetectors, optical amplifiers, switching elements, add/drop multiplexers etc.

Each optical communications housing or cabinet houses a multitude of "customer cables"—fiber optic cables that typically connect to one or more optical fiber network components, such as cross-connect panels, distribution panels, etc. A large number of customer cables are typically routed throughout each optical communications housing. However, since fiber optic cables are typically fragile, if the fiber optic cable is bent beyond the minimum bend radius during board or module removal, the fiber optic cable may break. Additionally, the fiber optic cables housed within optical communications equipment may be exposed to various handling and routing damage, such as when the doors to the equipment are shut due to the close fit between the doors and the fiber optic cables.

An optical communication housing may also contain "matrix cables". Matrix cables are fiber optic cables that interconnect optical communications housings to other optical communications housings, as opposed to connecting to fibers from outside that location. Typically, customers do not want the matrix cables to be intermingled with the customer cables. However, with existing fiber management solutions, it is impossible to prevent such commingling of customer cables and matrix cables.

Typically fiber management solutions include elements that are added to the optical communications housing to manage the fiber optic cables as they exit the housing and travel either up to overhead or down to under-floor paths for the fiber optic cables. Such elements provide a means of routing the fiber optic cables, and, in some cases, they can also take up excess fiber optic cable lengths, also known as "slack".

The recent increase in bandwidth requirements for telecommunications systems has resulted in more densely packed equipment and a greatly increased number of fiber optic cables per piece of equipment than prior systems. This increased number of fibers has severely taxed the current state of the art fiber management solutions with unacceptable levels of congestion, and limited slack storage capacity. Fibers are potentially damaged when congestion areas occur and there is no organized route for the fibers to follow. Many carriers or other consumers of optical communications equipment have a very limited floor space in which to place new equipment and fiber optic cables. If the communications equipment can be more densely packed, then a greater amount of equipment and fiber optic cables may be placed within the available space.

Thus, there is a need in the art to provide an inexpensive, compact means for routing large numbers of fiber optic cables and storing fiber slack in an organized way. This should be easily installed and adapted by an installer to prevent the fiber optic cables from being bent beyond their minimum bend radii, to prevent high levels of fiber congestion, and prevent intermingling of customer cables and matrix cables.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a front elevational view showing fiber optic cable management systems provided with an optical communications housing, and in accordance with an embodiment of the present invention;

FIG. 2 is a top plan view of one fiber optic cable management system shown in FIG. 1;

FIG. 3 is a partial perspective view of the top half of one fiber optic cable management system shown in FIGS. 1 and 2, with the cover plate removed;

FIG. 4 is a front elevational view of the fiber optic cable management system shown in FIGS. 1–3, with the cover plates removed; and FIG. 5 is a side elevational view of the fiber optic cable management system shown in FIGS. 1–4.

DETAILED DESCRIPTION OF EMBODIMENTS OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Referring now specifically to the drawings, fiber optic cable management systems 12 provided with an optical communications housing 14 and according to an embodiment of the present invention is illustrated in FIG. 1 and shown generally as reference numeral 10. The system 12 has particular application in the telecommunications industry for managing the connection, storage, and distribution of fiber optic cables to and from optical communications housing 14. FIG. 1 shows a plurality of fiber optic cable management systems 12 connected to optical communications housing or cabinet 14. Optical communication modules may be installed in optical communications housing 14 with respective mounting brackets used for mounting the optical communication modules to support racks (not shown) of the optical communications housing 14.

Although FIG. 1 only shows two (left and right) fiber optic cable management systems 12, an application-specific number of fiber optic cable management systems 12 may be provided, ranging from one to as many that will fit optical communications housing 14. As further shown in FIG. 1, the left and right fiber optic cable management systems 12 may be mirror images of each other, but may have different sizes, depending upon the optical communications application. Since the left and right systems 12 are preferably mirror images, reference will be made to a single fiber optic cable management system 12, but applies equally to both fiber optic cable management systems 12.

As shown in FIGS. 2 and 3, each fiber optic cable management system 12 includes a frame 16 for housing and supporting remaining portions of fiber optic cable management system 12. Frame 16 may be provided with two removable cover plates 13, as shown in FIGS. 1 and 2, that cover and protect the fiber optical cables provided within frame 16. Frame 16 maybe shaped to conform with and attach to a side portion of optical communications housing 14, as shown in FIG. 1. Although frame 16 of one fiber optic cable management system 12 may extend along the entire height of optical communications housing 14, it may be divided into two parts to ease handling and shipping of system 12. Frame 16 may connect to optical communications housing 14 in a variety of ways, including via screws, nuts and bolts, rivets, etc.

Although not required, frame 16 preferably includes a channel portion 18 for receiving, retaining, and guiding matrix fiber optic cables 100 therein, as shown in FIGS. 2 and 3. Since many customers do not want customer and matrix fiber optic cables to intermingle, channel portion 18 provides a simple, convenient mechanism for separating matrix fiber optic cables 100 from customer fiber optic cables (the routing of which is described more fully below). Channel portion 18 may extend along the entire height or a portion of the height of frame 16.

As further shown in FIGS. 3 and 4, each fiber optic cable management system 12 also includes a saddle bracket support 20 that extends along the height of and internally within frame 16. Saddle bracket support 20 may be integrally formed with frame 16, or may connect to frame 16 in a variety of ways, including via screws, nuts and bolts, rivets, etc. A plurality of saddle brackets 22 extends from and connects to saddle bracket support 20. Saddle bracket support 20 further includes a plurality of sidewall portions 21 that, together with saddle brackets 22, define vertical channels through which customer fiber optic cables may be disposed. Sidewall portions 21 may be a variety of heights but are preferably substantially the same heights as saddle brackets 22. Sidewall portions 21 may be intermittently or continuously provided along the vertical edges of saddle bracket support 20. Preferably, sidewall portions 21 are substantially perpendicular to the plane of the saddle bracket support 20.

Each saddle bracket 22 includes a curved portion 24 that may be integrally formed with or connected to a retainer portion 26. Curved portion 24 and retainer portion 26 of each saddle bracket 22 define a channel through which customer fiber optic cables are disposed. Preferably, retainer portion 26 of each saddle bracket is substantially perpendicular to and extends above the top surface of curved portion 24 of each saddle bracket 22, as best seen in FIG. 3. Customer fiber optic cables are draped within the channel at an associated radius that exceeds the minimum bend radii of the customer fiber optic cables, as described more fully below. Preferably, as many saddle brackets 22 as possible, allowing room for fiber, are provided in each fiber optic cable management system 12, and each saddle bracket 22 will preferably have a short height, sized to match potential fiber volumes. Preferably, saddle brackets 22 are spaced a short distance (are substantially adjacent to) from each other, so that a multitude of saddle brackets 22 may be provided on saddle bracket support 20.

Providing a multitude of saddle brackets 22 creates a ladder-like structure for managing the excess slack in the customer fiber optic cables. Such an arrangement also reduces excess slack in the customer fiber optic cables since the increment to the next saddle bracket is minimized. With more saddle brackets for a given number of fibers, less customer fiber optic cables are provided per saddle bracket 22, allowing each bracket to be less deep, which enables more hand space for a technician to manipulate and route the customer fiber optic cables. Although the specific numerical heights and spacings of saddle brackets 22 are dependent upon the application of fiber optic cable management system 12, the heights of saddle brackets 22 may best be seen in FIG. 4, wherein exemplary heights of saddle brackets 22 extend approximately to one-quarter of the width of frame 16.

A plurality of tube brackets 28 may also be provided at a bottom portion of and connected to saddle bracket support 20 to further manage customer fiber optic cables, as described more fully below with reference to FIG. 5. Preferably, at least one tube bracket 28 is provided to left of the vertical column of saddle brackets 22, and at least one tube bracket 28 is provided to the right of the vertical column of saddle brackets 22. Tube brackets 28 provide bend radius protection for fibers entering and exiting the slack storage ladder of saddle brackets 22. A plurality of tube brackets 30 may also be provided at a top portion of and connected to frame 16. Tube brackets 30 preferably provide bend radius protection to the fibers as they enter the fiber optic cable management system 12 at the top front and are guided to the back of the frame 16.

Retaining members 32 may also be provided with each tube bracket 28, 30 to define the two separate channels through which customer fiber optic cables are disposed. They also serve to retain fibers in place. Customer fiber optic cables are bent within the channels at associated radii that exceed the minimum bend radii of the customer fiber optic cables, as described more fully below.

A fiber throughway 34 may be provided to route customer fiber optic cables from optical communications housing 14 to fiber optic cable management system 12. Fiber throughway 34 may be integrally formed with or may connect to frame 16 in a variety of ways, including welding, adhesive, etc. A proper bend radius, consistent with the fiber optic cables being used, should be included at the opening of fiber throughway 34.

The routing and management of customer fiber optic cables 102 through fiber optic cable management system 12 of the present invention is best shown in FIG. 5. Although only a few customer fiber optic cables 102 are depicted in FIG. 5 for clarity purposes, fiber optic cable management system 12 is capable of handling a multitude of customer cables 102. Furthermore, although the matrix cables 100 shown in FIG. 3 are not shown in FIG. 5 it is to be understood that matrix cables 100 and customer cables 102 may be provided in fiber optic cable management system 12, without the intermingling of matrix cables 100 and customer cables 102.

As shown in FIG. 5, the fiber optic cable management system 12 shows exemplary routing configurations, however, the fiber optic cable management system 12 of the present invention is in no way limited to these routing configurations, and may be altered depending upon application. With reference to the top fiber optic cable management system 12, customer cables 102 may enter system 12 through fiber throughway 34 and may be looped around one tube bracket 28. Then, depending upon the length of customer cables 102, the customer cables 102 may be draped over the curved portion 24 of a particular saddle bracket 22. Customer cables 102 may then be looped around another tube bracket 28 and exit fiber optic cable management system 12 toward the front or rear of system 12.

With reference to the bottom fiber optic cable management system 12, customer cables 102 may enter system 12 through a lower portion of system or from the fiber throughway 34 and may be looped around one tube bracket 28 and extend vertically upward into system 12. Then, depending upon the length of customer cables 102, the customer cables 102 may be draped over the curved portion 24 of a particular saddle bracket 22. Customer cables 102 may then be looped around another tube bracket 28, traverse up the back of fiber optic cable management system 12, and follow the outside channel created by the tubes 30 and retaining members 32 to the front and out the top of system 12.

These discrete paths for the upper and lower fibers reduce congestion by dividing the slack storage into two discrete sections, reducing fiber congestion and the build-up of excessive fibers on any one saddle bracket 22. The two ladders of saddle brackets 22 (provided in the upper and lower portions of system 12) prevent slack from developing in customer cables 102. Slack exposes customer cables 102 to the danger of being damaged.

The curved portions 24 of each saddle bracket 22 and curved tube brackets 28, 30 of fiber optic cable management system 12 prevent customer fiber optic cables 102 from being bent beyond their minimum bend radii. This prevents the glass fibers used in customer fiber optic cables 102 from being damaged, ensuring the signal transmission quality and integrity of the cables. The fiber optic cable management system 12 also contains no sharp edges, which further prevent fiber optic cables from being damaged.

The radius of curved portions 24 of each saddle bracket 22 and curved tube brackets 28, 30 of fiber optic cable management system 12 may vary depending upon the customer fiber optic cable being used with fiber optic cable management system 12. However, the minimum bend radius of the customer fiber optic cables being used dictates the radius of curved portions 24 of each saddle bracket 22 and curved tube brackets 28, 30 of fiber optic cable management system 12. As discussed previously, the minimum bend radius of a fiber optic cable depends upon a variety of factors, including the signal handled by the fiber optic cable, the style of the fiber optic cable, and equipment to which to fiber optic cable is connected. Thus, curved portions 24 of each saddle bracket 22 and curved tube brackets 28, 30 of fiber optic cable management system 12 may have a variety of radii greater than or equal to the minimum bend radii of the customer fiber optic cables, depending upon the type of customer cables being utilized. Curved portions 24 of each saddle bracket 22 and curved tube brackets 28, 30 of fiber optic cable management system 12 may, for example, have a radius greater than or equal to 0.75 inches (for fiber optic cables having a minimum bend radius of 0.75 inches), or a radius greater than or equal to 1.0 inches (for fiber optic cables having a minimum bend radius of 1.0 inches).

There are a variety of ways to manufacture fiber optic cable management system 12. System 12 or portions of system 12 may be cast from a metal, or may be injection molded. If molding is selected, system 12 or portions of system 12 may be molded from a compliant, high-strength plastic, or other material meeting the rigorous Network Equipment Building System (NEBS) reliability and flammability ratings. Thus, fiber optic cable management system 12 or portions thereof may be made from a material that attenuates ESD, EMI, or other destructive energy. In this regard, system 12 or portions thereof may be made from a heavily nickel-doped plastic.

It will be apparent to those skilled in the art that various modifications and variations can be made in the fiber optic cable management system of the present invention and in construction of this system without departing from the scope or spirit of the invention. As an example, typically, fiber optic cable management system 12 of the present invention will include multiple, evenly spaced saddle brackets 22, wherein all of the saddle brackets 22 have the same dimensions. However, system 12 could also include multiple, differently spaced saddle brackets, with each saddle bracket having different dimensions. Likewise, tube brackets 28, 30 could have different dimensions.

System 12 of the present invention is not limited to use with fiber optic cables, and may be used with any cable having a minimum bend radius or having a need for organization, such as, for example, telephone cable having a plurality of copper conductors, coaxial cable, or the like. In such an application, the fiber optic cables shown in the drawings, would be replaced with any cable having a minimum bend radius, such as telephone cable having a plurality of copper conductors, coaxial cable, or the like. Other examples of the modifications and variations that may be made to fiber optic cable management system of the present invention were set forth previously.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fiber optic cable management system, comprising:
   a frame having a vertical channel portion formed along at least a portion of a height of the frame, the vertical channel portion being for retaining and guiding fiber optic cables between a top and a bottom of the frame;
   a saddle bracket support disposed internally within said frame, said saddle bracket support having a plate-shaped portion extending parallel to side walls of the frame, and also having and a plurality of sidewall portions intermittently provided along front vertical edges thereof; and
   a plurality of saddle brackets connected to said saddle bracket support, said saddle bracket support and said plurality of saddle brackets being housed within said frame, each saddle bracket having:
   a curved portion having a radius of curvature that guides the fiber optic cables from a first direction to a second direction, and prevents the fiber optic cables from being bent beyond their minimum bend radii, and
   a retainer portion connected to the curved portion, wherein the curved and retainer portions retain the fiber optic cables within each of said saddle bracket,
   wherein said saddle brackets are substantially adjacent to each other, and each saddle bracket has a height approximately equal to one-quarter the width of said frame, and
   wherein said sidewall portions together with said saddle brackets define vertical channels through which the fiber optic cables are disposed.

2. A fiber optic cable management system as recited in claim 1, wherein the retainer portion of each saddle bracket is substantially perpendicular to the corresponding curved portion of each saddle bracket.

3. A fiber optic cable management system as recited in claim 1, wherein the retainer portion of each saddle bracket extends above the surface of the corresponding curved portion of each saddle bracket.

4. A fiber optic cable management system as recited in claim 1, wherein said saddle brackets are arranged in a vertical, ladder-like configuration.

5. A fiber optic cable management system as recited in claim 1, wherein said saddle brackets are evenly spaced from each other.

6. A fiber optic cable management system as recited in claim 1, wherein the radius of curvature of the curved portion of each saddle bracket is greater than or equal to the minimum bend radii of the fiber optic cables.

7. A fiber optic cable management system as recited in claim 1, further comprising tube brackets connected to said saddle bracket support, wherein said tube brackets guide the fiber optic cables into said plurality of saddle brackets, and prevent the fiber optic cables from being bent beyond their minimum bend radii.

8. A fiber optic cable management system as recited in claim 1, wherein the vertical channel is substantially rectangular in shape and extending outward from a central portion of a side wall of the frame.

9. A fiber optic cable management system as recited in claim 8, wherein the sidewall portions are substantially perpendicular to the plane of said saddle bracket support.

10. A fiber optic cable management system as recited in claim 1, wherein the sidewall portions have substantially the same heights as said plurality of saddle brackets, the sidewall portions and the saddle brackets each extending from the saddle support bracket in a direction away from the vertical channel portion.

11. A fiber optic cable management system as recited in claim 1, wherein the frame is provided with a fiber throughway for routing customer cables from a housing to frames of other fiber optic cable management systems the fiber throughway penetrating through a front portion of said frame.

12. A fiber optic cable management system as recited in claim 1, further comprising a fiber throughway connected to said frame, and guiding the fiber optic cables to and from said plurality of saddle brackets.

13. A fiber optic cable management system as recited in claim 1, wherein said channel portion retains and guides matrix fiber optic cables therein.

14. A fiber optic cable management system as recited in claim 1, further comprising tube brackets connected to said frame, wherein said tube brackets provide multiple, segregated paths for the fiber optic cables to reduce congestion of the fiber optic cables, and prevent the fiber optic cables from being bent beyond their minimum bend radii.

15. A fiber optic cable management system, comprising:
   a frame;
   a saddle bracket support disposed internally within said frame, said saddle bracket support having a plate-shaped portion extending parallel to side walls of the frame, and also having and a plurality of sidewall portions intermittently provided along front vertical edges thereof;
   a plurality of interconnected saddle brackets fixed to the saddle support bracket, each saddle bracket having:
   a curved portion having a radius of curvature that guides the fiber optic cables from a first direction to a second direction, and prevents the fiber optic cables from being bent beyond their minimum bend radii, and a retainer portion connected to the curved portion, wherein the curved and retainer portions retain the fiber optic cables within each of said saddle brackets, wherein said sidewall portions together with said saddle brackets define vertical channels through which the fiber optic cables are disposed.

16. A fiber optic cable management system as recited in claim 15, wherein the retainer portion of each saddle bracket is substantially perpendicular to the corresponding curved portion of each saddle bracket.

17. A fiber optic cable management system as recited in claim 15, wherein the retainer portion of each saddle bracket extends above the surface of the corresponding curved portion of each saddle bracket.

18. A fiber optic cable management system as recited in claim 15, wherein said plurality of interconnected saddle brackets is arranged in a vertical, ladder-like configuration.

19. A fiber optic cable management system as recited in claim 15 further comprising at least one upper tube bracket provided on each of two opposite faces of the saddle support bracket adjacent to a top end of the frame.

20. A fiber optic cable management system as recited in claim 19, wherein said tube brackets are connected to the saddle bracket support, wherein said tube brackets guide the fiber optic cables into said plurality of interconnected saddle brackets, and prevent the fiber optic cables from being bent beyond their minimum bend radii.

21. A fiber optic cable management system as recited in claim 15, wherein said saddle brackets are evenly spaced from each other.

22. A fiber optic cable management system as recited in claim 15, wherein the radius of curvature of the curved portion of each saddle bracket is greater than or equal to the minimum bend radii of the fiber optic cables.

23. A fiber optic cable management system as recited in claim 15, wherein a first and a second lower tube provided on a lower part of the saddle support bracket, with the first lower tube bracket being provided forwardly of said plurality of interconnected saddle brackets, and the second lower tube being provided rearwardly of said plurality of interconnected saddle brackets.

24. A fiber optic cable management system as recited in claim 15, further comprising a vertical channel, the vertical channel being substantially rectangular in shape and extending outward from a central portion of a side wall of said frame.

25. A fiber optic cable management system as recited in claim 24, wherein the sidewall portions have substantially the same heights as said plurality of saddle brackets.

26. A fiber optic cable management system as recited in claim 24, wherein the sidewall portions are intermittently provided along a vertical edge of said saddle bracket support.

27. A fiber optic cable management system as recited in claim 24, wherein the sidewall portions are substantially perpendicular to the plane of said saddle bracket support.

28. A fiber optic cable management system as recited in claim 15, further comprising a frame for housing said plurality of interconnected saddle brackets.

29. A fiber optic cable management system as recited in claim 28, further comprising a fiber throughway connected to said frame, and guiding the fiber optic cables to and from said plurality of interconnected saddle brackets.

30. A fiber optic cable management system as recited in claim 28, wherein said frame includes a channel portion for retaining and guiding matrix fiber optic cables therein, the matrix fiber optic cables being prevented from intermingling with the fiber optic cables.

31. A fiber optic cable management system as recited in claim 28, further comprising tube brackets connected to said frame, wherein said tube brackets provide multiple, segregated paths for the fiber optic cables to reduce congestion of the fiber optic cables, and prevent the fiber optic cables from being bent beyond their minimum bend radii.

32. A fiber optic cable management system as recited in claim 28, wherein each of said plurality of saddle brackets has a height approximately equal to one-quarter the width of said frame.

33. An apparatus, comprising:

an optical communications housing; and a plurality of fiber optic cable management systems connected to said optical communications housing and guiding fiber optic cables provided for said optical communications housing, each of the fiber optic cable management systems comprising:

a frame, a saddle bracket support disposed internally within said frame, said saddle bracket support having a plate-shaped portion extending parallel to side walls of the frame, and also having and a plurality of sidewall portions intermittently provided along front vertical edges thereof, and a plurality of saddle brackets connected to said saddle bracket support, said saddle bracket support and said plurality of saddle brackets being housed within said frame, each of the saddle brackets having:

a curved portion having a radius of curvature that guides fiber optic cables from a first direction to a second direction, and prevents the fiber optic cables from being bent beyond their minimum bend radii, and a retainer portion connected to the curved portion, wherein the curved and the retainer portions retain the fiber optic cables within each of said saddle brackets, wherein said saddle brackets are substantially adjacent to each other, wherein said sidewall portions together with said saddle brackets define vertical channels through which the fiber optic cables are disposed.

* * * * *